US012435556B2

(12) United States Patent
Johnson

(10) Patent No.: US 12,435,556 B2
(45) Date of Patent: Oct. 7, 2025

(54) DOOR MOUNTING SYSTEM

(71) Applicant: Nathan Johnson, Elkhart, IN (US)

(72) Inventor: Nathan Johnson, Elkhart, IN (US)

(73) Assignee: LE Johnson Products Inc., Elkhart, IN (US)

( * ) Notice: Subject to any disclaimer, the term of this patent is extended or adjusted under 35 U.S.C. 154(b) by 60 days.

(21) Appl. No.: 18/375,165

(22) Filed: Sep. 29, 2023

(65) Prior Publication Data

US 2025/0109622 A1 Apr. 3, 2025

(51) Int. Cl.

*E05F 3/00* (2006.01)
*E05D 15/06* (2006.01)
*E05F 5/00* (2017.01)
*E05F 5/06* (2006.01)

(52) U.S. Cl.

CPC .............. *E05F 5/06* (2013.01); *E05D 15/063* (2013.01); *E05F 5/003* (2013.01); *E05Y 2201/254* (2013.01); *E05Y 2900/14* (2013.01)

(58) Field of Classification Search

CPC ..... E05F 5/003; E05F 5/05; E05F 5/06; E05F 1/08; E05F 1/1091; E05F 1/16; E05F 3/00; E05F 3/02; E05F 3/04; E05F 3/18; E05F 3/227; E05F 3/22; E05F 3/10; E05F 3/108; E05F 3/224; E05Y 2800/24; E05Y 2201/64; E05Y 2201/644; E05Y 2201/264; E05Y 2201/254; E05Y 2201/41; E05Y 2201/47; E05Y 2201/21; E05Y 2201/488; E05Y 2201/48; E05Y 2201/482; E05Y 2201/492; E05Y 2900/132;

(Continued)

(56) References Cited

U.S. PATENT DOCUMENTS

| | | | | |
|---|---|---|---|---|
| 2,405,020 | A * | 7/1946 | Dierking ................ | A47H 15/02 16/87.8 |
| 2,732,919 | A | 1/1956 | Johnson, Jr. | |
| 2,818,608 | A | 1/1958 | Lawrence, III | |

(Continued)

FOREIGN PATENT DOCUMENTS

| | | | |
|---|---|---|---|
| CN | 202227849 | U * | 5/2012 |
| CN | 203188763 | U | 9/2013 |

(Continued)

OTHER PUBLICATIONS

European Patent Office, International Search Report and Written Opinion issued in corresponding PCT/US2024/048492, Dec. 5, 2024, 10 pages.

(Continued)

*Primary Examiner* — Chuck Y Mah

(74) *Attorney, Agent, or Firm* — Barnes & Thornburg LLP

(57) ABSTRACT

A pocket door mounting system includes a dampener assembly, an actuator arm, a stop member and a door hanger. The dampener assembly includes a housing having a first end having an opening, a second end, a roller mechanism pivotally connected to the second end, and a dampener mechanism. The damper mechanism has a trigger for actuating the dampener mechanism. The actuator arm has a first end and a second end. The door hanger has a bracket having an opening. A pin extends through the opening in the dampener assembly and the opening in the door hanger to connect the dampener assembly to the door hanger.

7 Claims, 11 Drawing Sheets

(58) Field of Classification Search
CPC ........... E05Y 2900/142; E05Y 2900/14; E05D 15/063; E05D 15/0652
USPC ............................................................... 16/72
See application file for complete search history.

(56) References Cited

U.S. PATENT DOCUMENTS

| | | | | |
|---|---|---|---|---|
| 5,605,016 | A | 2/1997 | Pollard | |
| 8,402,606 | B1 * | 3/2013 | Tsai | E05F 5/003 16/49 |
| 10,151,130 | B2 * | 12/2018 | Wang | E05F 1/16 |
| 10,273,743 | B2 | 4/2019 | Gosling et al. | |
| 2013/0160240 | A1 * | 6/2013 | Kenny | E05F 1/16 16/89 |
| 2015/0047150 | A1 * | 2/2015 | Saito | E05F 5/02 16/103 |
| 2017/0051548 | A1 * | 2/2017 | Wang | E05F 5/027 |
| 2017/0198511 | A1 * | 7/2017 | Shin | E06B 3/4636 |
| 2020/0080358 | A1 * | 3/2020 | Iijima | E05F 1/16 |
| 2020/0190882 | A1 * | 6/2020 | Bantle | E05F 3/00 |
| 2021/0010309 | A1 * | 1/2021 | Montecchio | E05D 15/0652 |
| 2021/0062568 | A1 | 3/2021 | Johnson | |
| 2021/0340803 | A1 | 11/2021 | Terno | |
| 2021/0381293 | A1 * | 12/2021 | Zimmer | E05F 5/003 |

FOREIGN PATENT DOCUMENTS

| | | | |
|---|---|---|---|
| EP | 3095941 | A1 | 11/2016 |
| JP | 5889666 | B2 | 3/2016 |
| KR | 101186377 | B1 * | 9/2012 |
| KR | 101718659 | B1 * | 3/2017 |

OTHER PUBLICATIONS

Johnson Hardware, 2060 Pocket Door Frame Features, L.E. Johnson Products, 2 pages, Aug. 2008.

Johnson Hardware, Instructions 1060 Soft Close, L.E. Johnson Products, 2 pages, Sep. 2015.

Johnson Hardware, 100SD/134F/138F/2610F Pocket Door Instructions, L.E. Johnson products, 2 pages, Sep. 2015.

* cited by examiner

DOOR MOUNTING SYSTEM

The present invention relates to door hardware, and, in particular, to a door mounting system.

BACKGROUND AND SUMMARY OF THE INVENTION

Various door mounting systems are known in the art. For example, door hinges are a well-known method for mounting a door within a doorway such that the door can be pivoted about the hinges to open and close the door. Various door mounting systems for various types of sliding doors are also known. For example, U.S. Pat. No. 10,273,743 B2 shows one example of a pocket door and a mechanism for mounting a pocket door.

In one embodiment of the present invention, a door mounting system and door include a door, a track, a dampener assembly, an actuator arm, a stop member and a door hanger. The track has an upper flange, a lower flange, and a connecting section. The dampener assembly has a housing, a roller mechanism, a first dampener mechanism, and a second dampener mechanism. The housing has a first end, a second end, a first channel, and a second channel. The first end of the housing has a first tab having an opening and a second tab having an opening. The roller mechanism has a bracket pivotally mounted to the second end of the housing. The bracket has spaced apart arms and at least two rollers mounted between the arms and spaced apart from each other. The rollers are positioned on opposite sides of the connecting section of the track and supported by the lower flange of the track. The first dampener mechanism is located in the first channel, and the second dampener mechanism is located in the second channel. Each dampener mechanism has a cylinder, a rod extendable from and retractable into the cylinder, and a trigger connected to the rod. Each of the triggers is moveable within the channels and has an actuation member, a reset member, and a notch located between the actuation member and the reset member. The actuator arm has a body portion having an upper surface and a lower surface, a first end, a second end configured to fit within the notch of the triggers, a first narrowed portion located between the body portion and the first end, a second narrowed portion located between the body portion and the second end, and a plurality of tabs extending from opposite sides of the body portion and turned upwardly toward first surface. The actuator arm is positioned below the lower flange of the track with the lower flange of the track located between the tabs of the actuator arm. The stop member has a first member having a tab extending therefrom, a second member having a tab extending therefrom, and a slot between the first member and the second member. The connecting section of the track is positioned within the slot, and the narrowed portion of the actuator arm adjacent the first end of the actuator arm is positioned within the slot such that the first end of the actuator arm is positioned outside of the stop member. The door hanger has a bracket having a base, a first tab having an opening, a second tab having an opening, a plurality of rollers positioned on opposite sides of the connecting portion of the track and supported by the lower flange of the track, and a mounting mechanism. The mounting mechanism has a mounting plate connected to the door, a post extending from the mounting plate, and a latching mechanism connecting the post to the bracket of the door hanger. A pin extends through the openings in the first and second tabs of the first end of the housing of the dampener assembly and the openings in the first and second tabs of the door hanger to connect the dampener assembly to the door hanger.

In another embodiment of the present invention, a door mounting system includes a dampener assembly, an actuator arm, a stop member and a door hanger. The dampener assembly has a housing, a roller mechanism, and a dampener mechanism. The housing has a first end and a second end. The first end of the housing has an opening. The roller mechanism is pivotally connected to the second end of the housing. The dampener mechanism has a trigger for actuating the dampener mechanism. The actuator arm has a first end and a second end. The door hanger has a bracket having an opening. A pin extends through the opening in the housing of the dampener assembly and the opening in the door hanger to connect the dampener assembly to the door hanger.

In one embodiment, the dampener mechanism has a trigger for actuating the dampener mechanism, and the second end of the actuator arm is configured to actuate the trigger. In another embodiment, the trigger includes an actuation member, a reset member, and a notch located between the actuation member and the reset member, and the second end of the actuator arm is configured to fit within the notch.

In certain embodiments, the door mounting system further includes a track having an upper flange, a lower flange, and a connecting section located between the upper flange and the lower flange, and the actuator arm is located below the lower flange.

In one embodiment, the door mounting system further includes a track and a stop member. The track has an upper flange, a lower flange, and a connecting section located between the upper flange and the lower flange. The stop member has a first member located on one side of the connecting section of the track and a second member located on the opposite side of the connecting section of the track.

In other embodiments, the door mounting system further includes a stop member having a slot, a portion of the actuator arm is locate in the slot, and the first end of the actuator arm is located outside the stop member.

In yet another embodiment, the door mounting system includes a track having an upper flange, a lower flange supporting the dampener assembly and the door hanger, and a connecting section located between the upper flange and the lower flange. The housing of the dampener assembly is substantially parallel to the lower flange and the roller mechanism is substantially perpendicular to the lower flange when the dampener assembly is connected to the door hanger.

These and other features of the present invention will be apparent from the following detailed description of embodiments of the invention and the accompanying drawings.

DETAILED DESCRIPTION OF EMBODIMENTS OF THE INVENTION

Figure 1:
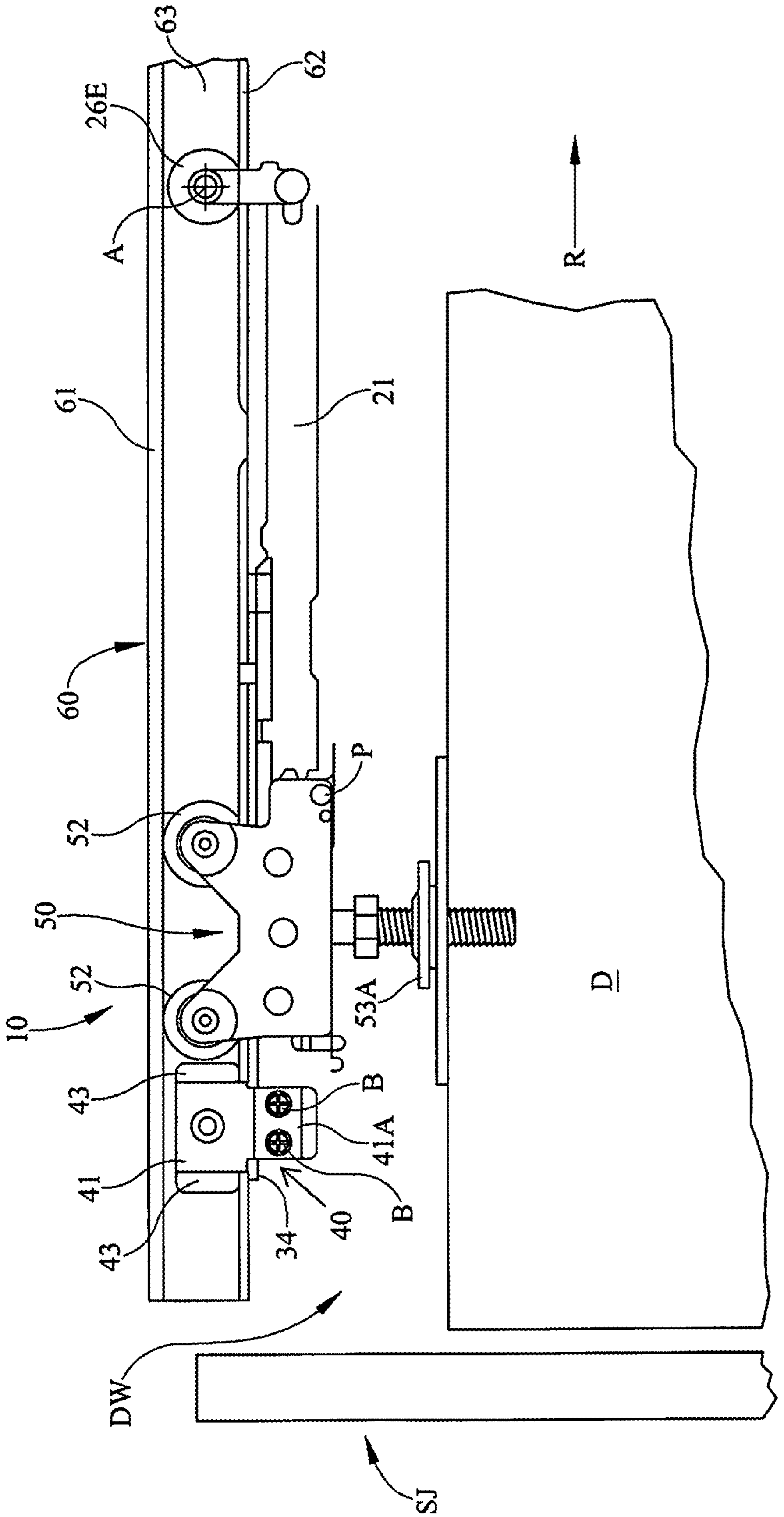
FIG. 1 is a side elevational view of a door mounting system according to one embodiment of the present invention connected to a door.

Referring to FIG. 1, a door mounting system 10 according to one embodiment of the present invention generally includes a dampener assembly 20, an actuator arm 30, a stop member 40, a door hanger 50, and a track 60. Door mounting system 10 may be used with a variety of different doors types, such as, for example, pocket doors.

Figure 3:
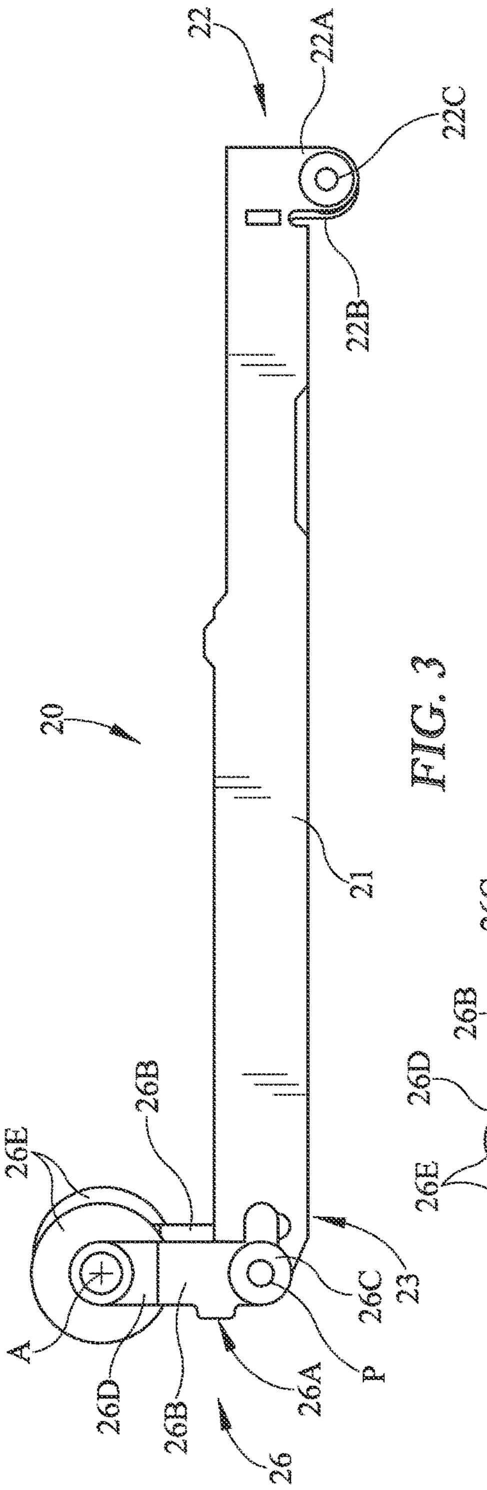
FIG. 3 is a side elevational view of the dampener assembly shown in FIG. 2.
Figure 2:
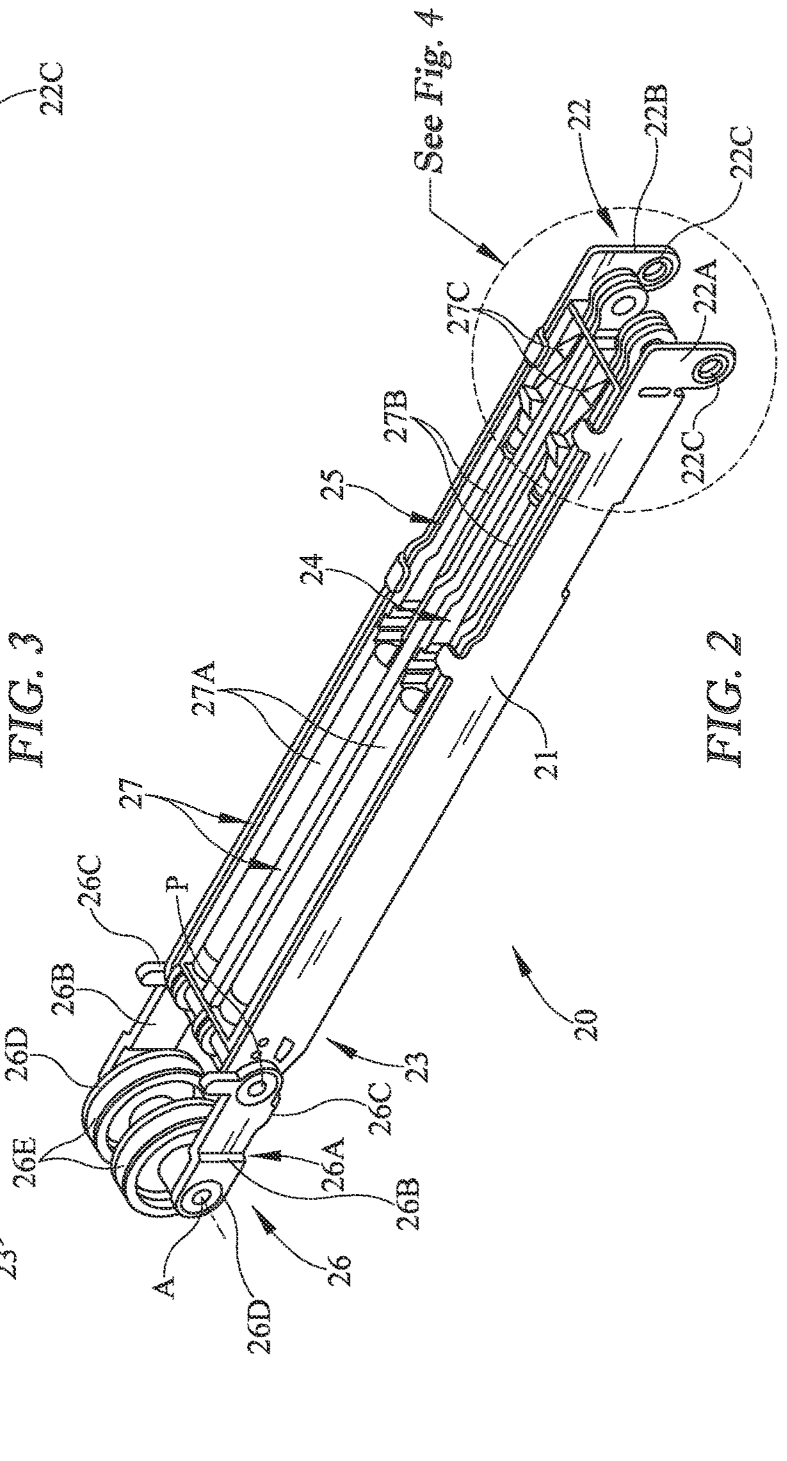
FIG. 2 is a perspective view of a dampener assembly that is a component of the door mounting system shown in FIG. 1.
Figure 4:
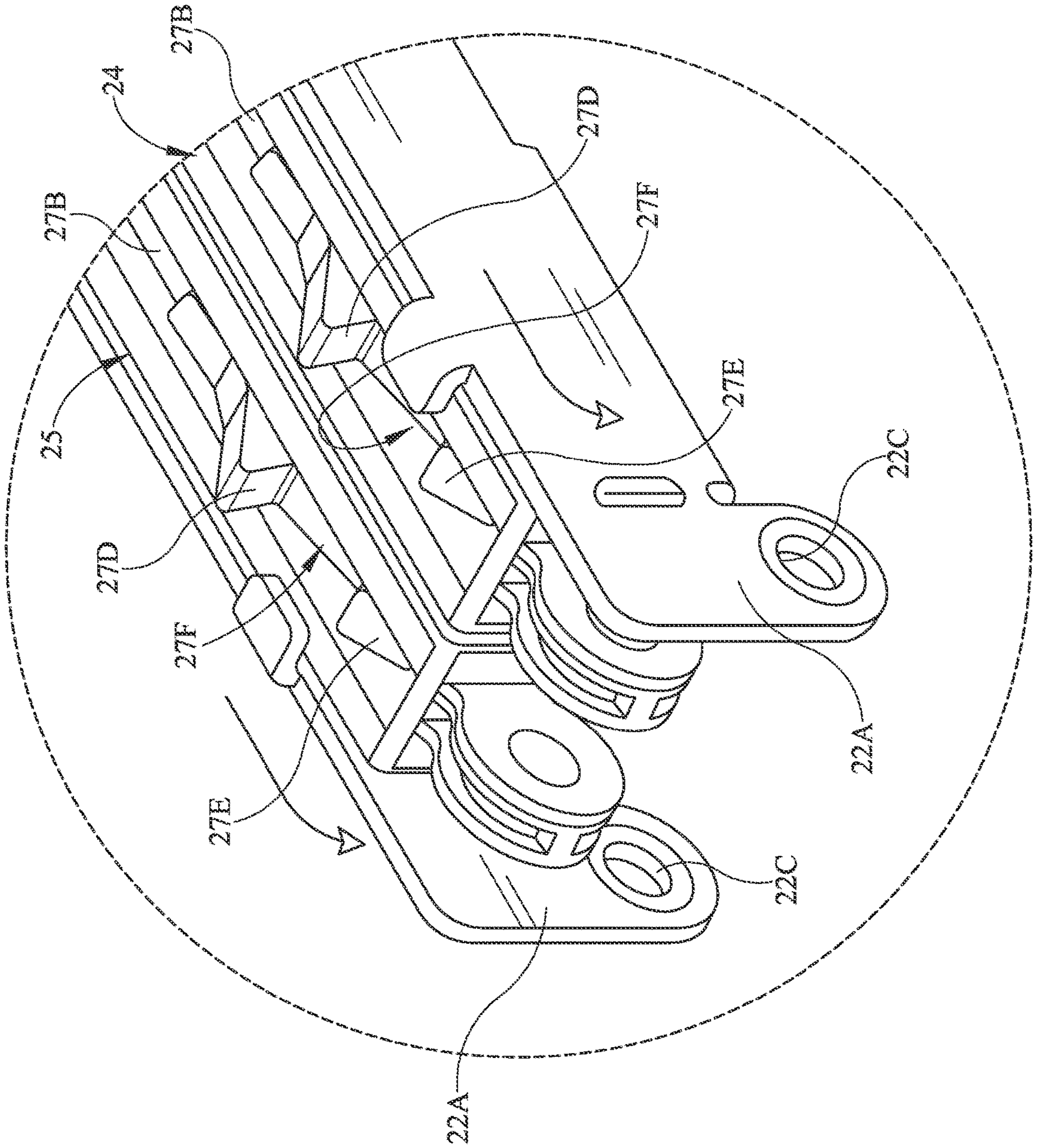
FIG. 4 is a perspective view of detail 4 indicated in FIG. 2.

Referring to FIGS. 2 and 3, dampener assembly 20 in the embodiment shown generally includes a housing 21 having first end 22, a second end 23, a first channel 24, a second channel 25, a roller mechanism 26, and two dampener mechanisms 27. First end 22 of housing 21 includes a first tab 22A and a second tab 22B. First tab 22A and second tab 22B are spaced apart from each other. First tab 22A and second tab 22B each include an opening 22C which is used to connect dampener assembly 20 to door hanger 50 as described below. Roller mechanism 26 includes a bracket 26A having spaced apart arms 26B. Each arm 26B has a first end 26C and a second end 26D. First end 26C of each arm 26B is pivotally connected to second end 23 of housing 21 at a pivot point P such as by a pin, rivet or other mechanism. Roller mechanism 26 further includes two rollers 26E. Rollers 26E are spaced apart from each other between second ends 26D of arms 26B and secured therebetween at axle points A such as by pins, rivets, or other mechanisms that permit rollers 26E to rotate between arms 26B about axle points A. A dampener mechanism 27 is located in each of first channel 24 and second channel 25 of dampener mechanism 20. Each dampener mechanism 27 in the embodiment shown is generally in the form of an air spring or similar device and includes a cylinder 27A, a rod 27B, and one or more triggers 27C connected to rod 27B. Rod 27B extends from and retracts into cylinder 27A as is known in the art. Referring to FIG. 4, each trigger 27C includes a an actuation member 27D and a reset member 27E positioned on opposite sides of a notch 27F. Reset member 27E is located closer to first end 22 of housing 21 than is actuation member 27D. As explained below, contact between actuator arm 30 and triggers 27C forces rod 27B toward cylinder 27A to resist motion of the door to which door mounting system 10 is attached in the direction of second end 23 of dampener assembly 20.

Figure 6:
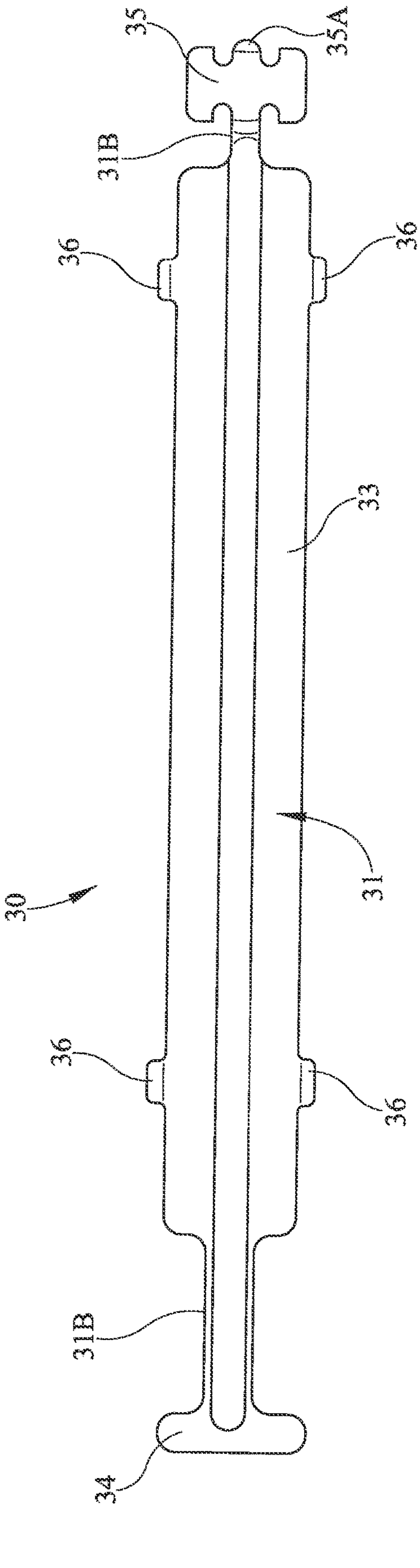
FIG. 6 is a bottom plan view of the actuator arm shown in FIG. 5.
Figure 5:
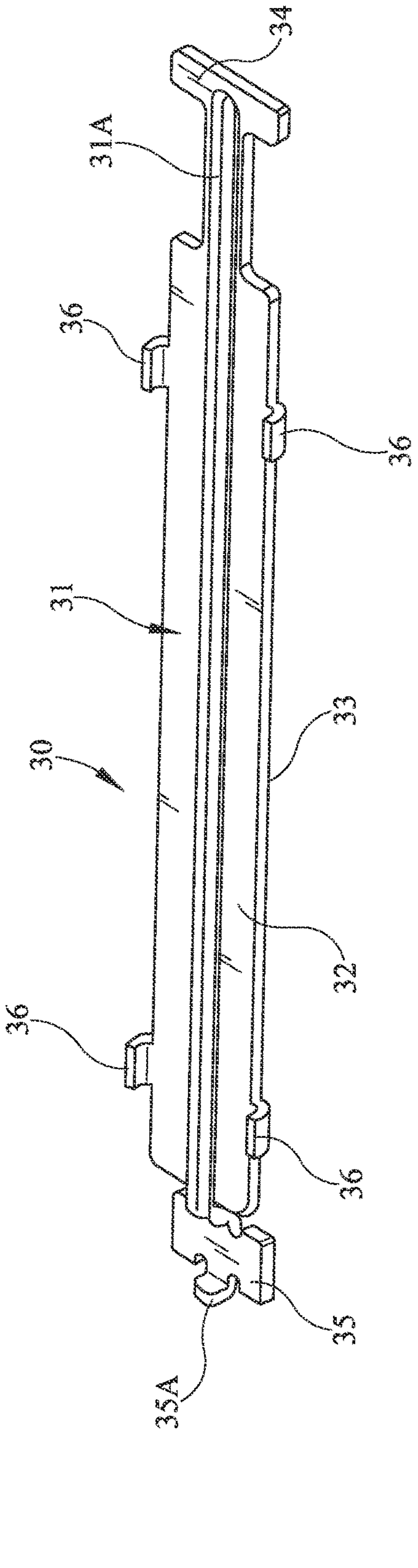
FIG. 5 is a perspective view of an actuator arm that is a component of the door mounting system shown in FIG. 1.

Referring to FIGS. 5 and 6, actuator arm 30 in the embodiment shown generally includes a body portion 31 having an upper surface 32, a lower surface 33, a first end 34, a second end 35, and a plurality of tabs 36 extending from opposite sides of body portion 31 and turned upwardly toward first surface 32. Body portion 31 of actuator arm 30 includes a narrowed or neck section 31A between first end 34 and the remainder of body portion 31. First end 34 in the embodiment shown is a generally rectangular shaped member that forms a generally T-shaped section with neck section 31A. Body portion 31 further includes a second narrowed or neck section 31B between second end 35 and the remainder of body portion 31. Second end 35 in the embodiment shown is also a generally rectangular shaped member that forms a generally T-shaped section with second neck portion 31B. Second end 35 includes a tab 35A turned upwardly in the direction of first surface 32 of body portion 31.

Figures 7, 8:
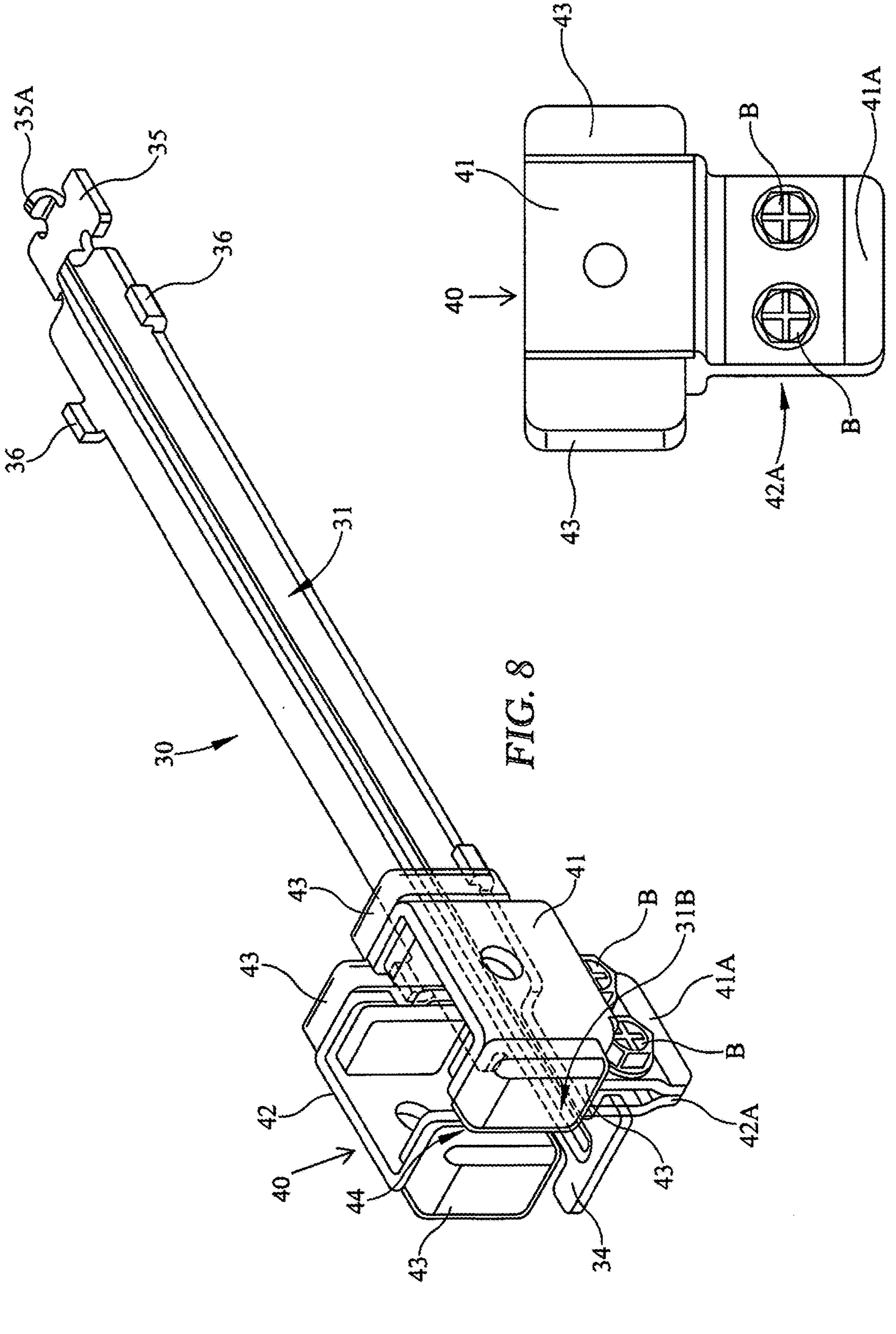
FIG. 7 is a side elevational view of a stop member that is a component of the door mounting system shown in FIG. 1.
FIG. 8 is a perspective view of the actuator arm shown in FIG. 5 connected to the stop member shown in FIG. 7.

Referring to FIGS. 7 and 8, stop member 40 generally includes a first member 41 and a second member 42. First member 41 and second member 42 are generally C-shaped or U-shaped channels having depending tabs 41A and 42A, respectively. Bumpers 43 are secured to the outer surfaces of first member 41 and second member 42. Bolts, screws, or other mechanisms B can be utilized to secure first member 41 to second member 42 through tabs 41A and 42A. When assembled in this manner, a space or slot 44 is formed between first member 41 and second member 42.

Figure 9:
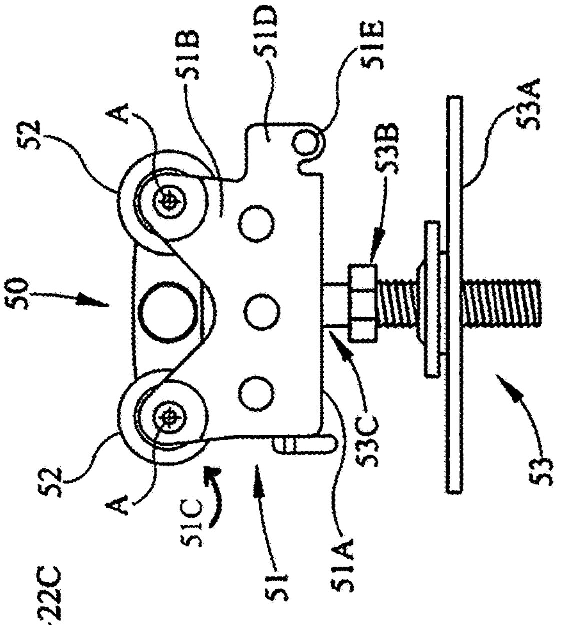
FIG. 9 is a side elevational view of a door hanger that is a component of the door mounting system shown in FIG. 1.
Figure 12:
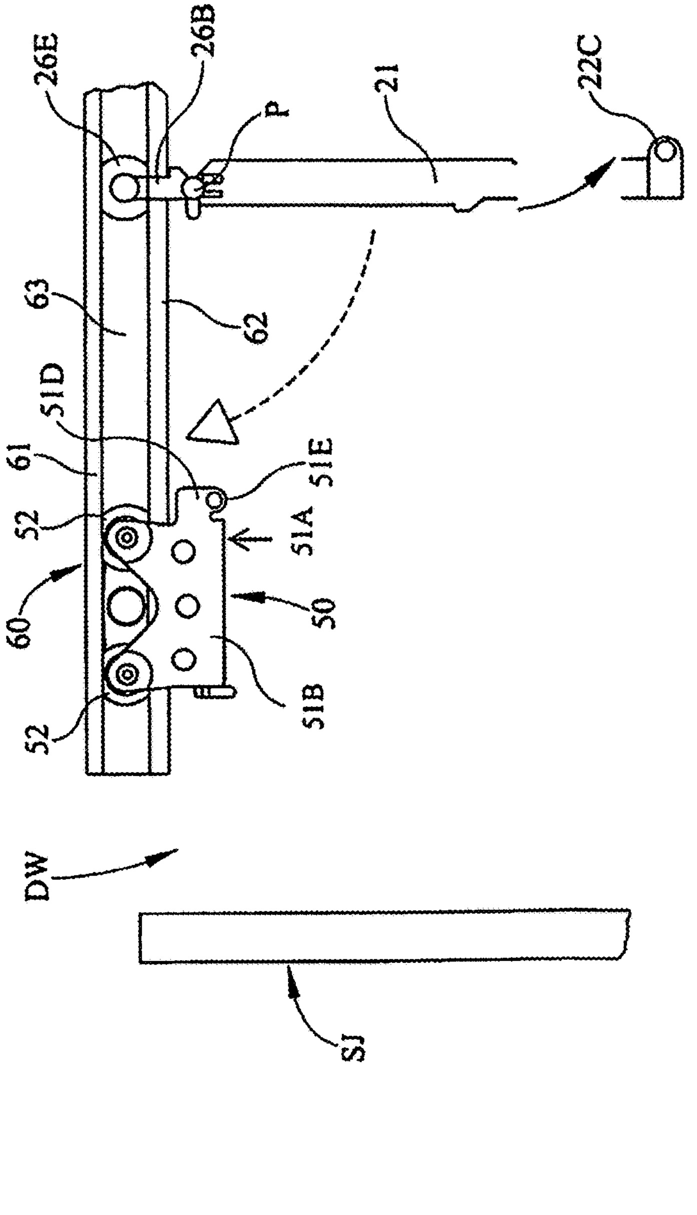
FIG. 12 is a side elevational view of the dampener assembly shown in FIG. 2 and the door hanger shown in FIG. 9 connected to a track shown in FIG. 10.

Referring to FIG. 9, door hanger 50 in the embodiment shown generally includes a bracket 51, a plurality of rollers 52, and a mounting mechanism 53. Bracket 51 includes a base 51A and a pair of spaced-apart sidewalls 51B and 51C. A tab 51D extends from one end of each of sidewalls 51B and 51C. Each tab 51D includes an opening 51E for use in connecting door hanger 50 to dampener assembly 20 as described below. Rollers 52 are spaced apart between sidewalls 51B and 51C in aligned pairs about axle points A by pins, rivets, or other mechanisms such that rollers 52 can rotate about axle points A. Mounting mechanism 53 generally includes a mounting plate 53A having a post 53B extending therefrom, and a latching mechanism 53C on base 51A of bracket 51 for securing bracket 51A to post 53B as is known in the art.

Figure 10:
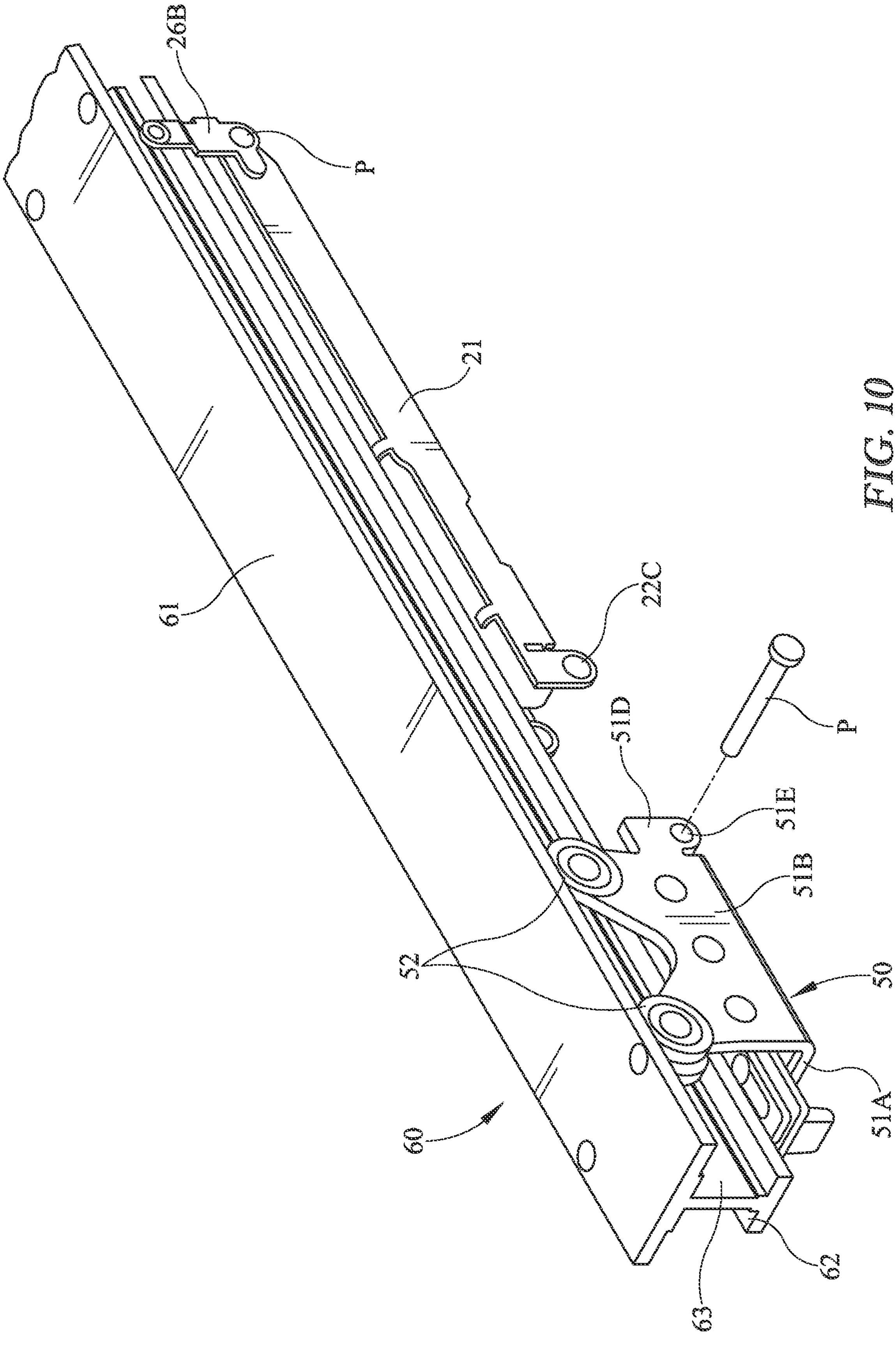
FIG. 10 is a perspective view of the dampener assembly shown in FIG. 2 and the door hanger shown in FIG. 9 connected to a track that is a component of the door mounting system shown in FIG. 1.

Track 60 in the embodiment shown has a generally I-shaped cross section and includes an upper flange 61, a lower flange 62, and a connecting section 63. In the embodiment shown, the width of upper flange 61 is wider than the width of lower flange 62. (FIG. 10)

Figure 11:
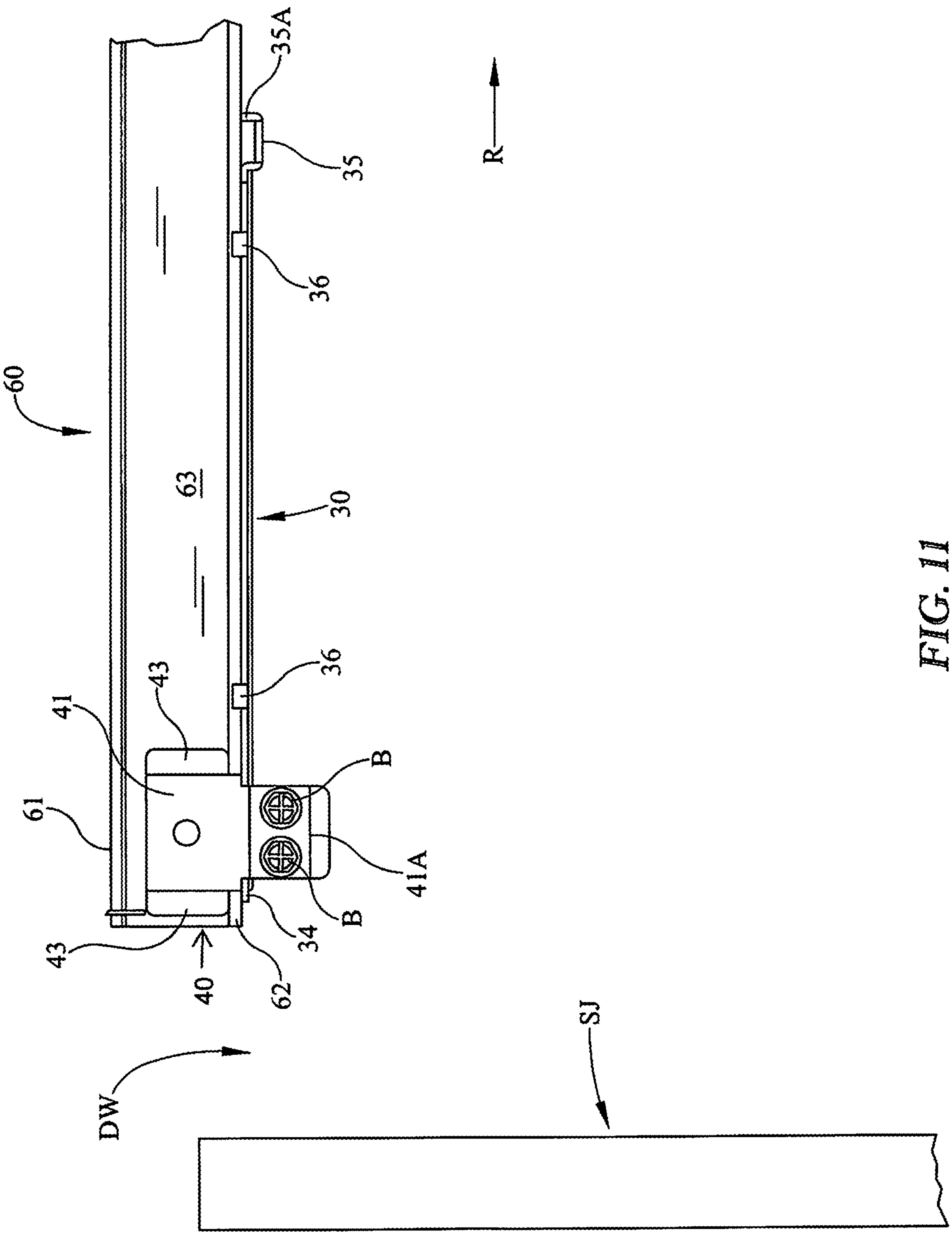
FIG. 11 is a side elevational view of the actuator arm shown in FIG. 5 and the stop member shown in FIG. 7 connected to the track shown in FIG. 10.
Figure 13:
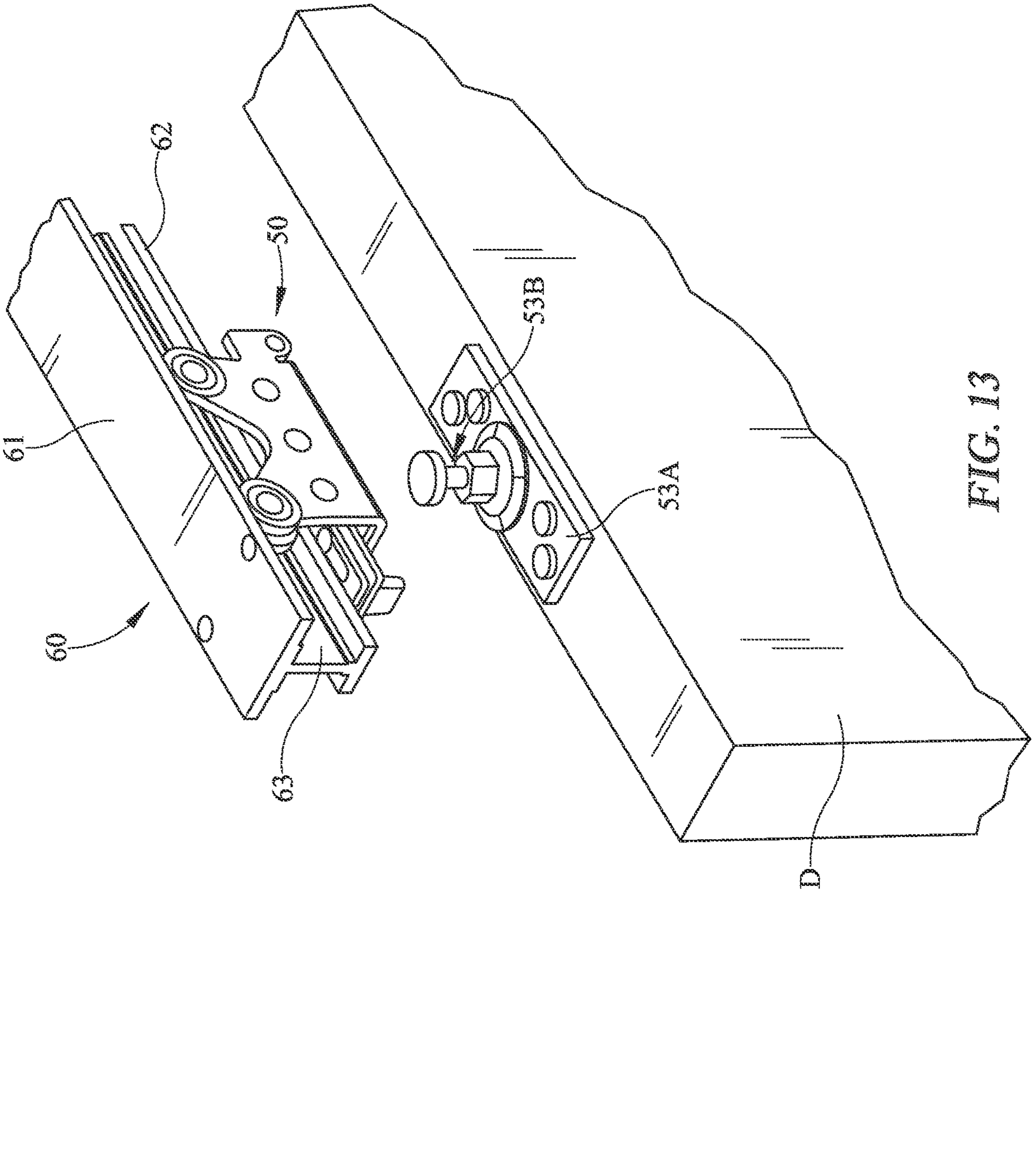
FIG. 13 is a perspective view illustrating the manner in which the door hanger shown in FIG. 9 may be connected to a door.

Referring to FIGS. 1, 8 and 10-13, door mounting system 10 can be connected to a door D and utilized to permit a user to slide door D from an open position to a closed position along track 60. To assemble and install door mounting system 10 and door D, track 60 is mounted above a doorway DW between a strike jamb SJ (i.e., the side of doorway DW toward which door D is pulled to close door D) and, for example, a pocket door recess R as is known in the art. Actuator arm 30 is joined to stop member 40 by positioning neck section 31A of actuator arm 30 in slot 44 of stop member 40 such that first end 34 of actuator arm 30 is positioned outside of stop member 40 as shown in FIG. 8. Actuator arm 30 and stop member 40 are then positioned on track 60 such that actuator arm 30 is below lower flange 62, lower flange 62 is positioned between tabs 36 on body portion 31 of actuator arm 30, first member 41 of stop member 40 is located on one side of connecting section 63 of track 60, and second member 42 of stop member 40 is located on the opposite side of connecting section 63 of track 60. Bolts B are then tightened to clamp connecting section 63 of track 60 between first half 41 and second half 42 of stop member 40, thereby securing stop member 40 and actuator arm 30 to track 60. As shown in FIGS. 1 and 11, stop member 40 is secured to track 60 adjacent the end of track 60 that is nearest strike jamb SJ.

Door hanger 50 is positioned on track 60 such that tabs 51D face away from stop member 40, connecting section 63 of track 60 is located between opposed rollers 52, and rollers 52 are supported by lower flange 62. In this position, base 51A of bracket 51 of door hanger 50 faces downward. Triggers 27C of dampeners 26 are set to the engaged or locked position, which prevents movement of rod 27B until triggers 27C are actuated by actuator arm 30 as described below. In the engaged position, actuation members 27D of triggers 27C extend above first channel 24 and second channel 25 of housing 21, and reset members 27E are recessed within first channel 24 and second channel 25. Dampener assembly 20 is positioned on track 60 such that first tab 22A and second tab 22B face toward door hanger 50, connecting section 63 of track 60 is positioned between rollers 26E, and rollers 26E are supported by lower flange 62 of track 60. Dampener assembly 20 is connected to hanger 50 by moving first end 22 of housing 21 toward door hanger 50, aligning openings 22C in first tab 22A and second tab 22B of housing 21 with openings 51E in tabs 51D of door hanger 50, and inserting a pin P through the openings. As first end 22 is moved toward door hanger 50, second end 23 pivots about pivot point P where first end 26C of arms 26B is connected to second end 23 of housing 21. Removing pin P permits dampener assembly 20 and hanger 50 to be separated. Door D is attached to door hanger 50 by inserting post 53B into latching mechanism 53C and securing post 53B in place as is known in the art. As installed on track 60, housing 21 of dampener assembly 20 is generally parallel to lower flange 62 of track 60, and roller mechanism 26 is generally perpendicular to lower flange 62 of track 60.

Figure 15:
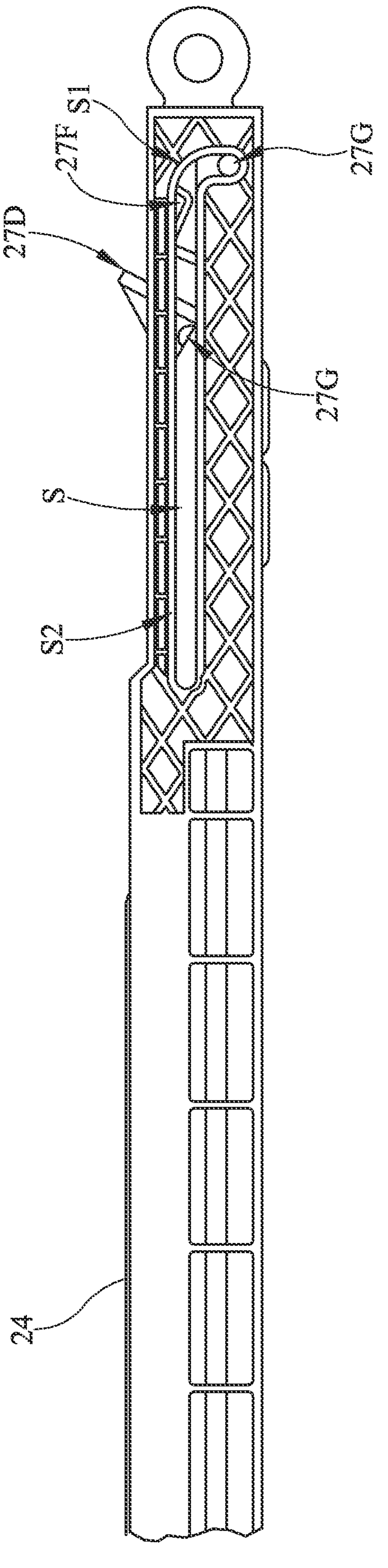
FIG. 15 is a side elevational view of a channel that is a component of the dampener assembly shown in FIG. 2.

When door D is moved from the open position to the closed position, door hanger 50 and dampener assembly 20 move with door D toward actuator arm 30 and stop member 40. As door D approaches strike jamb SJ, second end 35 of actuator arm 30 contacts actuation members 27D of triggers 27C, which in turn pushes rod 27B into cylinder 27A, thereby resisting motion of door D toward strike jamb SJ, which helps prevent door D from being slammed shut against strike jamb SJ. As second end 35 of actuator arm 30 engages actuation members 27D, reset members 27E of triggers 27C move upwardly. As triggers 27C move in this manner, second end 35 of actuator arm 30 is captured within recess 27F of triggers 27C. Door D can be moved toward strike jamb SJ until door hanger 50 contacts stop member 40. Channels 24 (shown in FIG. 15) and 25 can be provided with one or more curved slots S, and triggers 27C can be provided with one or more pins 27G that slide within slots S as they move within channels 24 and 25. Slots can be, for example, generally J-shaped members having a lower, curved section S1 adjacent first end 22 of housing 21 and an upper generally straight section S2 extending from the lower section toward second end 23 of housing 21. Actuation members 27D and reset members 27E move as described above as pins 27G move within slots S.

As door D is moved in the opposite direction, second end 35 of actuator arm 30 bears against reset member 27E and pulls rod 27B from cylinder 27A and toward recess R in doorway DW. As triggers 27C approach first end 22 of housing 21 of dampener assembly 20, they move back to the engaged position, thereby releasing second end 35 of actuator arm 30 from recesses 27F.

Figure 14:
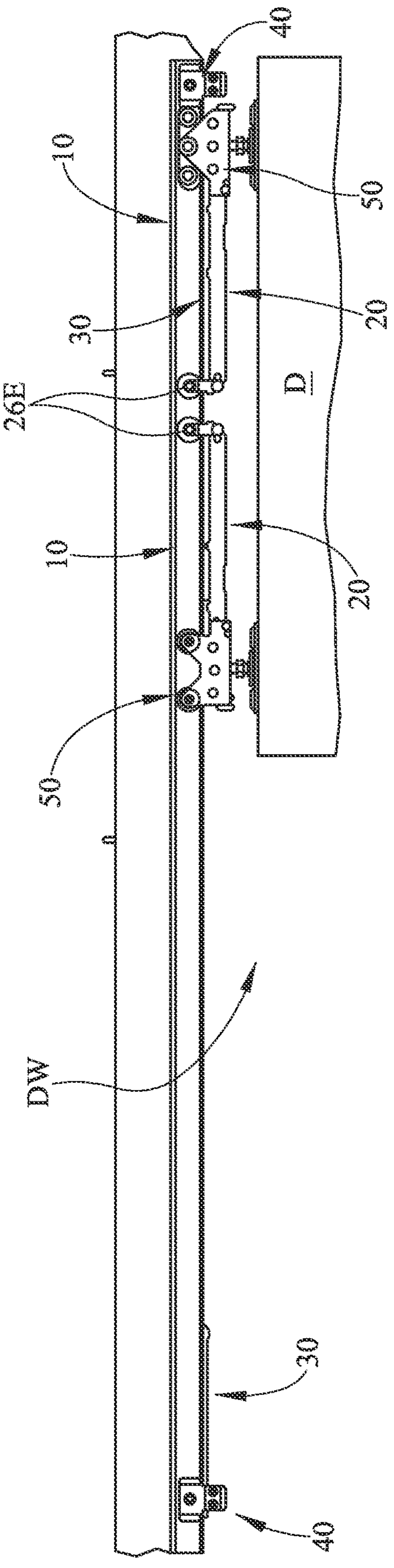
FIG. 14 is a side elevational view illustrating use of two of the door mounting systems shown in FIG. 1 in connection with a door.

Although the present invention has been shown and described in detail the same is for purposes of example only and should not be taken as a limitation on the scope of the invention. Numerous modifications can be made to the embodiments described without departing from the scope of the present invention. For example, multiple door mounting systems 10 can be utilized with a single door D as shown in FIG. 14 to provide dampening when door D is moved in both directions.

What is claimed is:

1. A door mounting system and door, including:

a door;

a track having an upper flange, a lower flange, and a connecting section;

a dampener assembly, the dampener assembly having a housing having first end, a second end, a first channel, a second channel, a roller mechanism, a first dampener mechanism located in the first channel, and a second dampener mechanism located in the second channel, the first end of the housing having a first tab having an opening and a second tab having an opening, the roller mechanism having a bracket pivotally mounted to the second end of the housing, the bracket having spaced apart arms and at least two rollers mounted between the arms and spaced apart from each other, the rollers positioned on opposite sides of the connecting section of the track and supported by the lower flange of the track;

each dampener mechanism having a cylinder, a rod extendable from and retractable into the cylinder, and a trigger connected to the rod, each of the triggers being moveable within the channels and having an actuation member, a reset member, and a notch located between the actuation member and the reset member;

an actuator arm having a body portion having an upper surface and a lower surface, a first end, a second end configured to fit within the notch of the triggers, a first narrowed portion located between the body portion and the first end, a second narrowed portion located between the body portion and the second end, and a plurality of tabs extending from opposite sides of the body portion and turned upwardly toward first surface, the actuator arm positioned below the lower flange of the track with the lower flange of the track located between the tabs of the actuator arm;

a stop member having a first member having a tab extending therefrom, a second member having a tab extending therefrom and a slot between the first member and the second member, the connecting section of the track positioned within the slot and the narrowed portion of the actuator arm adjacent the first end of the actuator arm positioned within the slot such that the first end of the actuator arm is positioned outside of the stop member;

a door hanger having a bracket having a base, a first tab having an opening, a second tab having an opening, a plurality of rollers positioned on opposite sides of the connecting portion of the track and supported by the lower flange of the track, and a mounting mechanism, the mounting mechanism having a mounting plate connected to the door, a post extending from the mounting plate, and a latching mechanism connecting the post to the bracket of the door hanger; and a pin extending through the openings in the first and second tabs of the first end of the housing of the dampener assembly and the openings in the first and second tabs of the door hanger to connect the dampener assembly to the door hanger.

2. A door mounting system, including:

a track;

a dampener assembly, the dampener assembly having a housing having a first end and a second end, the first end of the housing having an opening, the dampener assembly further including a roller mechanism pivotally connected to the second end of the housing, and a dampener mechanism, the dampener mechanism having a trigger for actuating the dampener mechanism;

an actuator arm having a first end and a second end;

a stop member connected to the track and to the actuator arm;

a door hanger connected to the track and moveable along the track toward the stop member, the door hanger having a bracket having an opening;

a pin extending through the opening in the housing of the dampener assembly and the opening in the bracket of the door hanger to connect the dampener assembly to the door hanger; and wherein movement of the door hanger toward the stop member causes the actuator arm to contact the trigger, which in turn actuates the dampener mechanism to resist movement of the door hanger in the first direction.

3. The door mounting system according to claim 2, wherein the trigger includes an actuation member, a reset member, and a notch located between the actuation member and the reset member, and the second end of the actuator arm is configured to fit within the notch.

4. The door mounting system according to claim 2, wherein the track has an upper flange, a lower flange, and a connecting section located between the upper flange and the lower flange, and wherein the actuator arm is located below the lower flange.

5. The door mounting system according to claim 2, wherein the track has an upper flange, a lower flange, and a connecting section located between the upper flange and the lower flange, and wherein the stop member has a first member located on one side of the connecting section of the track and a second member located on the opposite side of the connecting section of the track.

6. The door mounting system according to claim 2, wherein the stop member has a slot, and wherein a portion of the actuator arm is located in the slot and the first end of the actuator arm is located outside the stop member.

7. The door mounting system according to claim 2, wherein the track has an upper flange, a lower flange supporting the dampener assembly and the door hanger, and a connecting section located between the upper flange and the lower flange, and wherein the housing of the dampener assembly is substantially parallel to the lower flange and the roller mechanism is substantially perpendicular to the lower flange when the dampener mechanism is connected to the door hanger.

* * * * *